(12) United States Patent
Plötz

(10) Patent No.: US 6,484,792 B1
(45) Date of Patent: Nov. 26, 2002

(54) SINGLE USE TRANSPORTABLE REACTION CRUCIBLE FOR A METALLOTHERMIC WELDING PORTION

(76) Inventor: Rolf Plötz, Wiesenstrasse 12, D-51580 Reichshof (DE)

( * ) Notice: Subject to any disclaimer, the term of this patent is extended or adjusted under 35 U.S.C. 154(b) by 0 days.

(21) Appl. No.: 09/726,716

(22) Filed: Nov. 22, 2000

Related U.S. Application Data

(63) Continuation-in-part of application No. PCT/EP99/03519, filed on May 21, 1999.

(30) Foreign Application Priority Data

May 22, 1998 (DE) .......................................... 198 22 851

(51) Int. Cl.[7] ............................................. B23K 23/00
(52) U.S. Cl. ............................. 164/335; 164/54; 249/86
(58) Field of Search ..................... 164/335, 54; 249/86; 228/234.3

(56) References Cited

U.S. PATENT DOCUMENTS

| | | | | |
|---|---|---|---|---|
| 3,860,062 A | * | 1/1975 | McMurray et al. | ......... 164/333 |
| 4,063,720 A | * | 12/1977 | Boutet et al. | ................ 266/167 |
| 4,149,704 A | * | 4/1979 | de Savigny | .................. 266/167 |
| 4,522,322 A | * | 6/1985 | Guntermann et al. | ....... 222/597 |
| 5,151,202 A | * | 9/1992 | Bommart | ....................... 249/86 |
| 5,215,139 A | * | 6/1993 | Swartz et al. | .................. 164/54 |
| 5,715,886 A | * | 2/1998 | Fuchs | ........................... 164/54 |
| 5,829,510 A | * | 11/1998 | Fuchs | ........................... 164/54 |

FOREIGN PATENT DOCUMENTS

| | | | | |
|---|---|---|---|---|
| DE | 0 007 055 A1 | * | 1/1980 | ............ B23K/1/00 |
| DE | 197 02 410 C1 | * | 3/1998 | ........... B23K/23/00 |

* cited by examiner

Primary Examiner—M. Alexandra Elve
Assistant Examiner—Kevin P. Kerns
(74) Attorney, Agent, or Firm—R W Becker & Associates; R W Becker

(57) ABSTRACT

A single use, transportable reaction crucible for a metallothermic welding portion is provided. A separate cylindrical reaction vessel is disposed in the cylindrical casing of a non-metallic crucible shell, which has a flat base and a lid. The reaction vessel is supported on the base of the crucible shell and accommodates a welding portion. The outer diameter of the reaction vessel is less than an inner diameter of the cylindrical casing, with refractory material filling the annular intermediate space thereby formed between the reaction vessel and the cylindrical casing.

18 Claims, 3 Drawing Sheets

SINGLE USE TRANSPORTABLE REACTION CRUCIBLE FOR A METALLOTHERMIC WELDING PORTION

This is a continuation-in-part of PCT/EP99/03519 filed May 21, 1999.

BACKGROUND OF THE INVENTION

The present invention relates to a single use transportable reaction crucible for a metallothermic, especially aluminothermic, welding portion and includes a crucible shell having a cylindrical casing and a flat floor and a lid and in the crucible shell a refractory lining that receives the welding portion and that is provided in its base with an opening that can melt open.

Such a reaction crucible is known from DE 197 02 410 C1. In the known reaction crucible, the actual reaction crucible is stamped or riveted into a metal crucible shell in the form of a lining made of a sand mixture. For this reason the shell must be made from a high-strength, metallic, heavy material. A lighter and less expensive material such as cardboard, plastic, or the like cannot be used. Since the lining has a flat floor corresponding to the flat floor of the crucible shell, it does not facilitate the flow of the molten metal to the bottom opening. In the lining the welding portion is either fed into a conventional can or into a conventional plastic sack or into another container. When the reaction crucible is used, the lid is removed and the welding portion is ignited using an ignition rod, whereupon the lid is replaced. The metal crucible shell requires a separate removal from the application site.

SUMMARY OF THE INVENTION

The object of the present invention is to provide a reaction crucible of the aforementioned type in which less expensive materials can be used for the crucible shell and the actual reaction crucible is securely maintained in the crucible shell and has an inclined floor.

This object is achieved in that placed on the flat floor of the crucible shell, which is made of a non-metal material, is the flat underside of a support disc made of a refractory material and adapted to the interior diameter of the casing, the top surface of which forms a cone in the direction of a central opening, and in that the refractory lining is a specially produced cylindrical reaction vessel that has been inserted into the casing, the floor of which is configured in the shape of a cone to correspond to the top surface of the support disc and is placed on the disc and engages the central opening of the support disc with a hollow guide projection.

Since the crucible shell does not simultaneously have to serve as the exterior profile for the reaction vessel, it can be produced from a non-metallic material such as cardboard, laminated paper, plastic, or the like. At least the cylindrical casing and the floor of the crucible shell comprise preferably cardboard, plastic, or the like. Cardboard is particularly preferred for the material. The reaction vessel, which is produced as a separate component, is provided with a conical floor. The support disc ensures that the reaction vessel is securely supported and centered in the crucible shell.

Production tolerances during the manufacture of the reaction vessel and/or the construction of the overall wall thickness required for the melting reaction can be compensated in a preferred manner in that the outer diameter of the reaction vessel is smaller by a pre-specified amount than the inner diameter of the casing and the annular intermediate space is filled with a refractory material, preferably in the form of small particles.

There are a plurality of options for the design of the crucible shell. For instance, it is possible that the cylindrical casing and the floor of the crucible shell and at least one lid of the reaction crucible, the lid preferably being provided with an opening, are made of cardboard, laminated paper, or the like. The lid of the reaction crucible is thus made from the same material as the crucible shell. On the other hand, it is also possible that at least one lid of the reaction crucible, the lid preferably being provided with an opening, comprises a refractory material. In addition, it can be useful to use a double-lidded system in which an exterior lid made from one of the other materials cited in the foregoing is placed on an interior lid made of a refractory material.

In order to maintain the lid securely in place, it is advantageous when the cylindrical casing of the crucible shell extends beyond the free edge of the reaction vessel and at least one of the lids rests upon the free edge of the reaction vessel and is maintained by the overhanging section of the casing.

In order to ensure that the closure remains air-tight and/or moisture-tight, it is useful that, in addition to the lid or lids, a film is provided on the exterior side thereof as a protective and/or sealing protecting element, said film preferably covering the upper edge of the crucible shell casing.

It is thereby also possible that the parts of the crucible shell that are made of cardboard, plastic, or the like are protected from the penetration of moisture in that, e.g. if cardboard is used for the crucible cover, the cardboard is lined on its interior side with a metal film or the cardboard is provided with a film on the interior.

The guide projection can be embodied integrally with the reaction vessel or as a separate component. Embodying it separately facilitates inserting the melting seal into the guide projection that defines the floor opening of the reaction vessel.

At many sites where the metallothermic welding process is used, e.g. tunnels, it is desirable that dust be removed from gases exiting the reaction crucible. Therefore, it is useful when the opening in the lid is provided with a filter made of a refractory nonwoven web. It can be useful when an additional ignition opening is provided in the lid when the filter is joined securely to the lid over the exhaust opening.

A particularly stable construction of the crucible shell results when the floor of the crucible shell is provided with a circular flange and is glued into the casing such that the free edges of the casing and flange lie in the same plane.

Preferably a different refractory material is used for the support disc than is used for the reaction vessel, since the support disc undergoes less thermal stress when the crucible is used than does the reaction vessel. The filler material for the annular gap between casing and reaction vessel also undergoes less thermal stress than the reaction vessel and can therefore also be different.

In the reaction crucible in accordance with the invention, the welding portion is preferably introduced into the reaction vessel as free fill and the lid or lids are sealed air-tight and/or moisture-tight.

BRIEF DESCRIPTION OF THE DRAWING

Exemplary embodiments of the reaction crucible in accordance with the invention shall now be explained in more detail using the enclosed figures, in which.

DESCRIPTION OF PREFERRED EMBODIMENT

Figure 1:
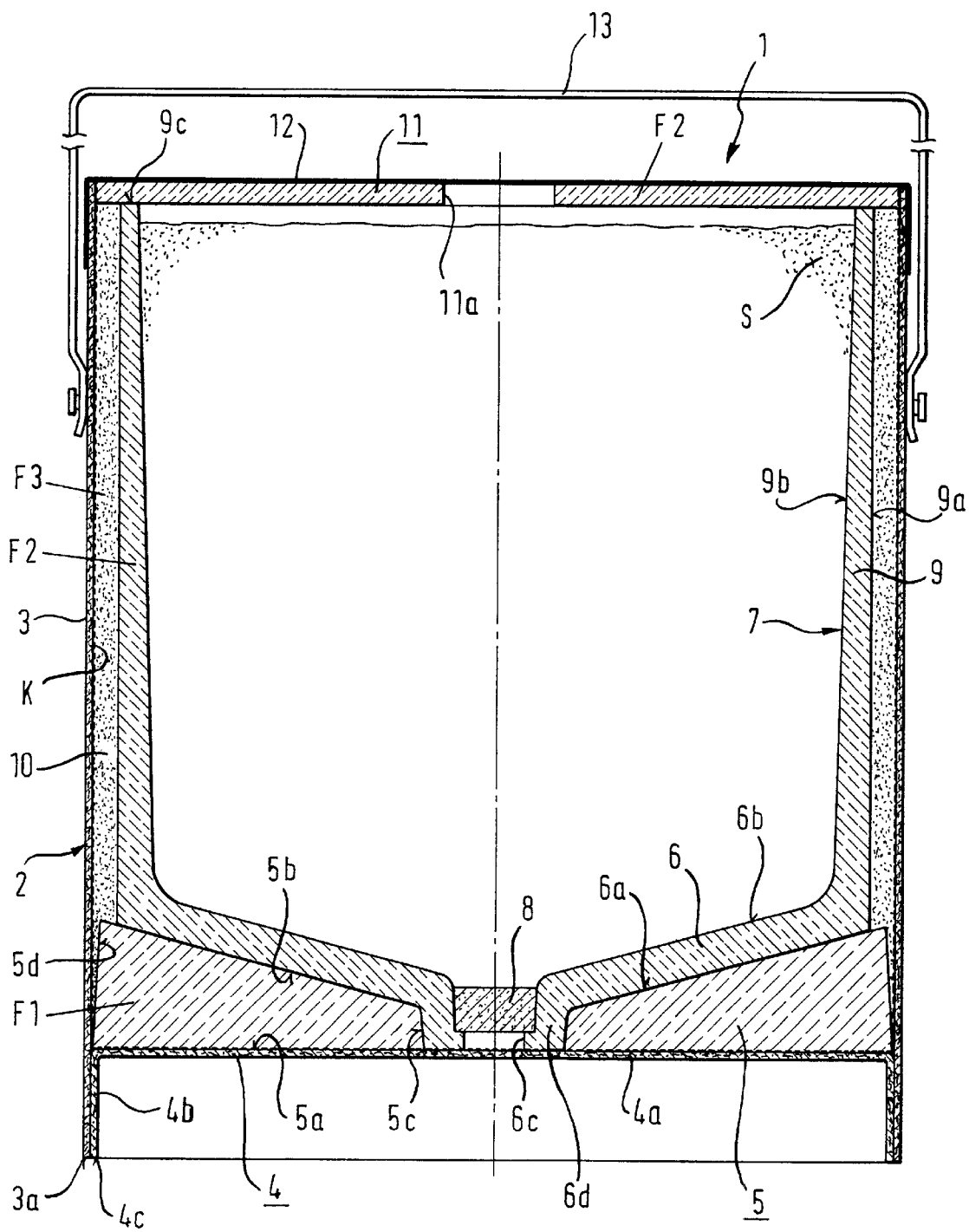
FIG. 1 is a vertical section through a reaction crucible.

Provided in the transportable reaction crucible 1 illustrated in FIG. 1 is a crucible cover or shell 2 that has a cylindrical casing 3 and a flat floor 4. Casing 3 and floor 4 are made from cardboard that is provided on its interior with a moisture-blocking aluminum lining K. The floor 4 has a floor section 4a and a circular flange 4b. The floor is glued to the casing 3 such that the free lower edge 3a of the casing and the free edge 4c of the flange lie in the same plane. The floor thus designed stiffens the crucible cover.

Placed on the flat top surface of the floor section 4a is the flat underside 5a of a support disc 5 that is made of a first refractory material F1, the exterior diameter of which is adapted to the interior diameter of the casing. The top surface 5b of the support disc forms a cone in the direction of a central opening 5c. The central opening 5c tapers downward in a cone. The exterior jacket surface 5d of the support disc 5 tapers upward slightly in a cone shape.

For receiving a welding portion S to be introduced into the reaction crucible as free fill, sitting on the conical top surface 5b of the support disc 5 is the underside 6a of the floor 6 of a separately produced reaction vessel 7 that is inserted into the crucible shell 2 and is made of a refractory material F2, the underside also being conical in conformity with the conicity of the top surface 5b of the support disc. The top surface 6b of the floor 6 inclines in a cone, in conformity with the conicity of the underside 6a, to a central discharge opening 6c formed in a guide projection 6d that extends downward from the underside 6a of the floor 6 and engages in the conical opening 5c of the support disc. The axial length of the hollow guide projection 6d, which is integral with the floor 6, should be dimensioned such that it is flush with the underside 5a of the support disc. A seal 8 that is meltable by the metallothermic reaction is inserted in the opening 6c. The cardboard floor under the opening 6c burns. However, it is also possible to provide the floor under the opening with a pre-punch.

The jacket 9 of the reaction vessel 7 is integral with the floor 6. The jacket 9 has a straight cylindrical exterior surface 9a and an interior surface 9b that tapers in a cone at the bottom so that the wall thickness of the jacket increases from top to bottom.

The outer diameter of the jacket is preferably selected such that it is smaller than the inner diameter of the casing 3 of the crucible shell. The annular space 10 thus created is filled with a fine-particle refractory product F3 such as sand and thus fixes and centers support disc 5 and reaction vessel 7 in the crucible shell.

As can be seen from FIG. 1, the casing 3 extends beyond the free upper edge 9c of the reaction vessel 7 by an amount that corresponds to the thickness of a lid 11 made of refractory material F2 and placed on the upper edge 9c. The diameter of the lid 11 corresponds to the inner diameter of the casing 3.

The lid 11 is provided with an ignition opening 11a through which the introduced welding portion 5 can be ignited. In order to protect the lid 11 and to seal the opening 11a, a film 12 is applied to the top surface of the lid and covers at least part of the casing 3. It is also possible to cover the entire reaction crucible with a film, preferably shrink film. For easier handling of the disposable crucible, one or more handles 13 are also attached to the casing.

Figure 2:
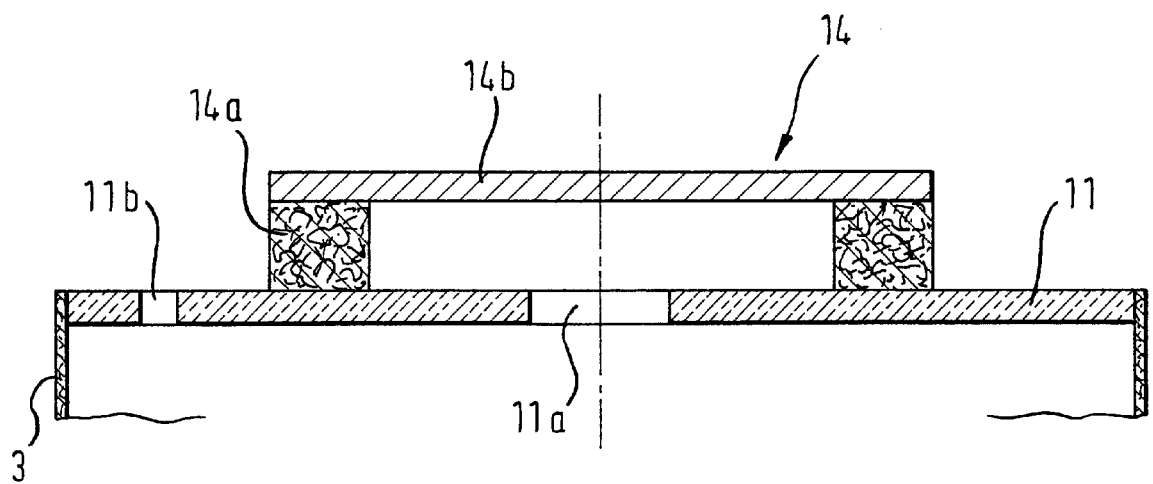
FIG. 2 is a vertical section through a lid with dust filter.

In the embodiment illustrated in FIG. 2, the lid 11 has also been allocated a dust filter 14 that covers the central opening 11a. The dust filter 14 comprises an annular refractory nonwoven web 14a that is maintained between the top surface of the lid 11 and a lid plate 14b. During the melting reaction, the gases flow through the opening 11a into the interior space of the filter and flow out radially outward. In this embodiment a second opening 11b can be provided in the lid for an ignition opening. The filter structure can also be covered with a shrink film.

Figure 3:
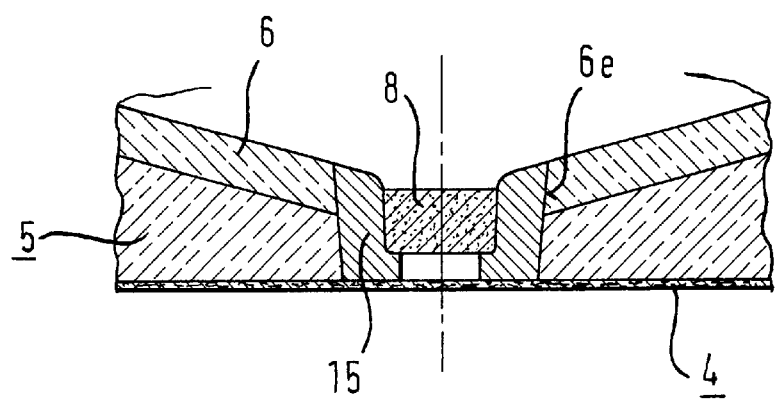
FIG. 3 is a partial vertical section through the bottom region of a reaction crucible in which the guide projection of the reaction vessel is produced as a separate component.

In the embodiment illustrated in FIG. 3, a guide projection 15 that is separate from the floor 6 of the reaction vessel is provided; it is inserted into a corresponding opening 6e of the floor.

Figure 4:
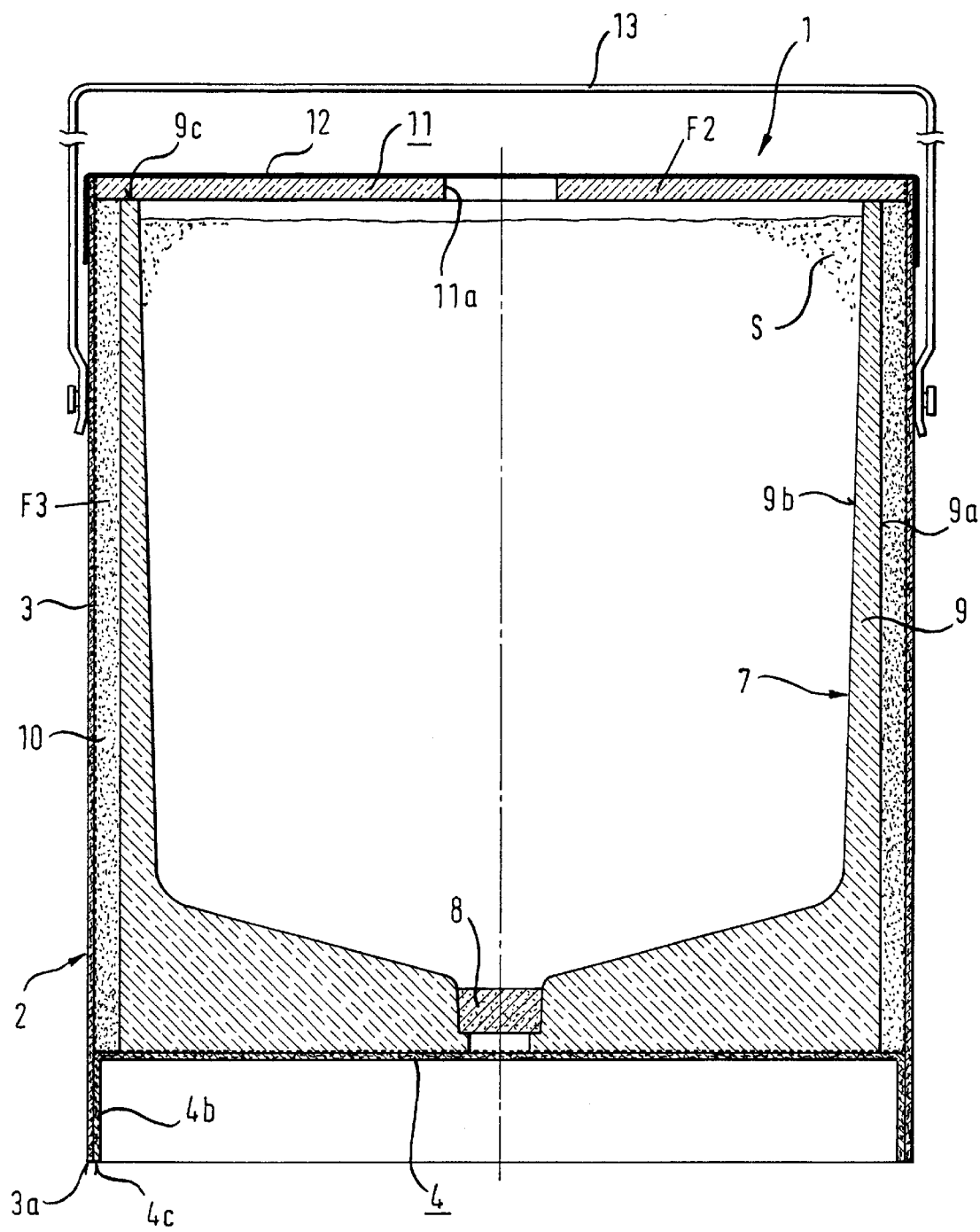
FIG. 4 is a vertical section through a modified embodiment of a reaction crucible where the support disc and the reaction vessel are single, monolithic component.

As illustrated in FIG. 4, the advantages of filling the annular intermediate space 10 that is provided between the casing 3 of the crucible shell 2, which is preferably produced cardboard, laminated paper, or the like, and the other surface of the cylindrical reaction vessel 7 with a refractory material F3 in fine particle form can also be achieved where the support disc 5 and the reaction vessel 7 that is inserted in the crucible shell 1 have a unitary or monolithic construction.

The specification incorporates by reference the disclosure of German priority document 198 22 851.1 of May 22, 1998 and International priority document PCT/EP99/03519 of May 21, 1999.

What is claimed is:

1. A single use, transportable reaction crucible for a metallothermic welding portion S, comprising:

a crucible shell 2 made of non-metallic material and having a cylindrical casing 3, a flat base 4, and a lid 11;

a separate cylindrical reaction vessel 7 that is made of refractory material and is disposed in said cylindrical casing 3 and is supported on said base 4 of said crucible shell 2, wherein said reaction vessel 7 accommodates a welding portion S and has a meltable opening in a base thereof, and wherein said reaction vessel has an outer diameter that is less than an inner diameter of said cylindrical casing 3 to thereby form an annular intermediate space 10 between said reaction vessel 7 and said cylindrical casing 3; and refractory material, in finely divided form, that fills said intermediate space 10.

2. A reaction crucible according to claim 1, wherein said base of said reaction vessel 7 has a conically sloping inner configuration.

3. A reaction crucible according to claim 1, wherein at least said cylindrical casing 3 and said base of said crucible shell 2 are made of cardboard, laminated paper or plastic.

4. A reaction crucible according to claim 3, wherein said lid 11 is also made of cardboard, laminated paper or plastic.

5. A reaction crucible according to claim 3, wherein said components are provided with means to protect such components against moisture.

6. A reaction crucible according to claim 3, wherein said crucible shell 2 is made of cardboard and is lined on an interior surface with metal K.

7. A reaction crucible according to claim 3, wherein said crucible shell 2 is made of cardboard and is provided with a film on an inner surface thereof.

8. A reaction crucible according to claim 1, wherein said lid 11 is provided with an opening 11a and is made of refractory material.

9. A reaction crucible according to claim 1, wherein said cylindrical casing 3 of said crucible shell 2 extends beyond a free edge 9c of said reaction vessel 7, and wherein said lid 11 rests upon said free edge of said reaction vessel and is held by that portion of said cylindrical casing 3 that extends beyond said free-edge 9c.

10. A reaction crucible according to claim 1, wherein a film 12 is provided on an exterior surface of said lid 11 as a protective element.

11. A reaction crucible according to claim 10, wherein said film 12 also covers an upper portion of said cylindrical casing 3 of said crucible shell 2.

12. A reaction crucible according to claim 1, wherein said lid 11 is provided with an opening 11a, and is furthermore provided with a filter 14 made of a refractory non-woven web 14a.

13. A reaction crucible according to claim 1, wherein said base 4 of said crucible shell 2 is provided with a circular flange 4b and is glued into said cylindrical casing 3 such that free edges 3a, 4c of said cylindrical casing and of said circular flange are disposed in the same plane.

14. A reaction crucible according to claim 1, wherein said welding portion S is introduced into said reaction vessel 7 in the form of free fill, and wherein said lid 11 is sealed in an air-tight or moisture-tight manner or both.

15. A reaction crucible according to claim 1, wherein a support disc 5 made of refractory material is disposed between said base 6 of said reaction vessel 7 and said base 4 of said crucible shell 2.

16. A reaction crucible according to claim 15, wherein said base of said reaction vessel 7 is provided with a hollow guide projection 6d that engages a central opening 5c of said support disc 5, and wherein said guide projection is integral with said reaction vessel 7 or is a separate component 15.

17. A reaction crucible according to claim 15, wherein said support disc 5 and said reaction vessel 7 are made of different refractory materials.

18. A single use, transportable reaction crucible for a metallothermic welding portion S, comprising:
   a crucible shell 2 made of non-metallic material and having a cylindrical casing 3, a flat base 4, and a lid 11;
   a separate cylindrical reaction vessel 7 that is made of refractory material and is disposed in said cylindrical casing 3 and is supported on said base 4 of said crucible shell 2, wherein said reaction vessel 7 accommodates a welding portion S and has a meltable opening in a base thereof, and wherein said reaction vessel has an outer diameter that is less than an inner diameter of said cylindrical casing 3 to thereby form an annular intermediate space 10 between said reaction vessel 7 and said cylindrical casing 3, wherein at least said cylindrical casing 3 and said base of said crucible shell 2 are made of cardboard, laminated paper or plastic; and
   refractory material, in finely divided form, that fills said intermediate space 10.

* * * * *